Patented June 5, 1928.

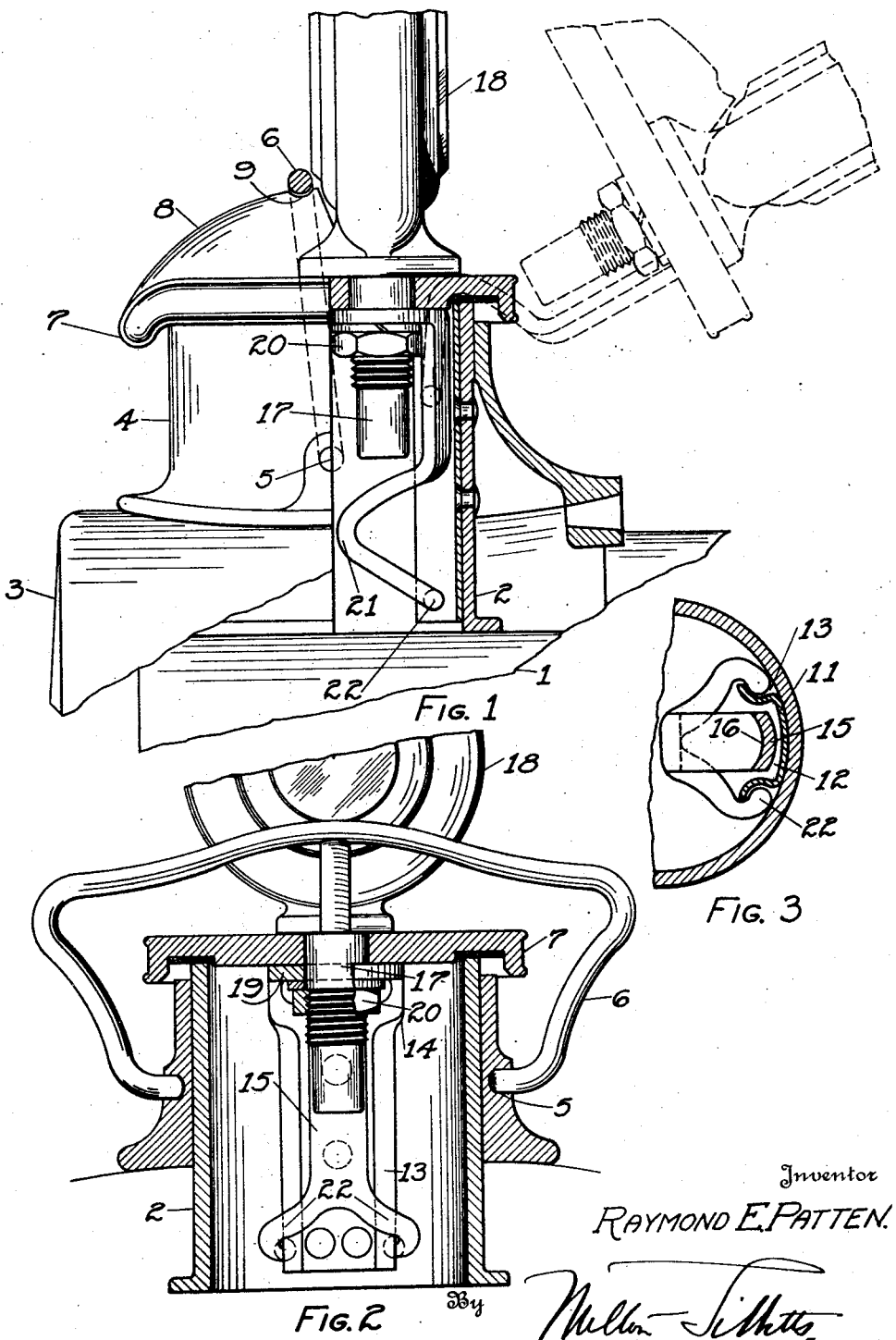

1,672,279

UNITED STATES PATENT OFFICE.

RAYMOND E. PATTEN, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed August 4, 1926. Serial No. 127,092.

This invention relates to motor vehicles and more particularly to motor vehicle radiator thimble caps.

An object of the invention is to provide a cap for the filling thimble of a motor vehicle radiator which is permanently connected to the thimble, the connection being concealed within the thimble to present an attractive exterior appearance to the cap.

Another object of the invention is to provide a cap for the filling thimble of a motor vehicle radiator which shall be so hinged to the thimble as to be easily opened or closed, the hinged connection being con15 cealed within the thimble to afford protection and prevent tampering therewith.

A further object of the invention is to provide a cap for the filling thimble of a motor vehicle radiator which shall be permanently connected to the thimble, the connecting means being concealed within the thimble and of such a character as to support the cap in a convenient manner when in an open position.

A still further object of my invention is to provide a hinged cap for the filling thimble of a motor vehicle radiator which shall be highly efficient in operation, yet of marked simplicity as a whole and in respect to each of its component parts so that its manufacture is economically facilitated both as regards to the parts and their assembly.

With these objects in view, which may be incident to my improvements, the invention consists of parts and combinations of parts to be hereinafter set forth and claimed with the understanding that the several necessary elements comprising my invention may be varied in construction, proportion and ar40 rangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings forming a part of my specification:

Fig. 1 is a side elevation of that portion of a motor vehicle radiator to which the filling thimble is connected together with a fragmentary portion of the radiator shell, partly in section, illustrating my invention as applied, the cap being shown in a closed position and in dotted lines in an open position;

Fig. 2 is a vertical sectional view through the thimble and cap; and

Fig. 3 is an enlarged detail view of the guide and connecting or hinge member.

Referring by numerals to the drawings, 1 represents the upper tank of a motor vehicle radiator having mounted thereupon and communicating therewith a filling thimble 2 through which water is admitted to the tank. The tank 1 and filling thimble 2 are enclosed by a radiator shell 3 having a sleeve 4 which fits snugly over the thimble 2. The sleeve 4 is provided with oppositely disposed recesses 5 in which is mounted a spring yoke 6. The spring yoke serves as a locking member to retain a cap 7 in a closed position on the thimble 2. The cap 7 is provided with a central arcuate rib 8 over which the spring yoke 6 is forced until it is brought to rest in a transverse groove 9 which prevents displacement.

Mounted vertically within the thimble 2 is a guide 11. The guide 11 is riveted or otherwise secured upon the inner circumference of the thimble 2 in a vertical position adjacent to the back of the radiator. The guide 11 is provided with a vertical channel 12 having arranged upon each side thereof corresponding parallel runways 13. The runways 13 are open at the bottom and closed at the top as indicated at 14, the object of which will hereinafter appear.

A connecting hinge member 15 having a concave body portion 16 which conforms to the channel 12 of the guide 11, is suspended from the shank 17 of a motometer 18. The motometer 18 is mounted in the top of the cap 7. The connecting hinge member 15 is provided upon one end with a flanged portion which is apertured to form a supporting washer 19. The washer 19 is clamped between the cap 7 and a tap 20 threaded upon the shank of the motometer. The other end of the connecting member 15 is bent in the form of a hook 21. The hook 21 provides a support or rest which engages the mouth of the thimble 2 when the cap is in an open position. The end of the hook portion is bifurcated to provide two corresponding arms 22, the ends of which are bent inwardly to engage and travel in the runways 13.

It will be noted that when the cap is in a closed position the connecting hinge member suspended therefrom rests within the channel 12 of the guide 11 with the bifurcated arms 22 in engagement with the runways 13 at a position a short distance removed from the extreme lower end of the runways. When the spring yoke 6 is released the cap 7 may be elevated or raised until the arms 22 engage the extreme upper ends of the runways 13. The cap is then thrown back in the open position and is supported in such position by the hook 21 engaging the mouth end of the thimble 2. The hook supports the cap in a convenient position. It will also be observed that in assembling the connecting member the tap 20 is removed from the shank 17 of the motometer 18. The connecting member is lowered in the thimble 2 and the bifurcated arms 22 thereupon are adjusted to the runways 13. The connecting member is then raised until the arms 22 are brought to bear in the top of the runways 13. The connecting member is then thrown back until the hook portion 21 engages the rim or mouth of the thimble 2. The supporting washer 19 is then adjusted upon the shank 17 of the motometer 18 and is locked or clamped thereupon by the tap 20 which is threaded upon the shank 17, thus completing the assembly.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

Having thus described the various features of my invention, what I claim as new and desire to secure by Letters Patent is:

1. A motor vehicle radiator having a filling thimble, a cap for the thimble, a member mounted on the cap, a guide in the thimble, corresponding runways on the guide, a connection member having a bifurcated end portion bent to engage and travel in the runways and means for adjusting the connection member to the member mounted on the cap.

2. A motor vehicle radiator having a filling thimble, a cap for the thimble, a motometer mounted on the cap, a channeled guide with parallel runways mounted in the thimble, a connection member adapted to slide in the guide, one end of the connection member bifurcated to form corresponding arms for engaging the runways and means for adjusting the other end of the connection member to the motometer.

3. A motor vehicle radiator having a filling thimble, a cap for the thimble, a motometer mounted on the cap, a channel guide with oppositely disposed parallel runways mounted in the thimble, a connection member adapted to slide in the channel guide, one end of the member bent to form a hook and bifurcated to provide two corresponding arms adapted to engage and travel in the runways and the other end of the member provided with means for attachment to the motometer.

4. A motor vehicle radiator having a filling thimble, a cap for the thimble, a motometer mounted on the cap, a pressed metal guide mounted in the thimble runways on the guide, a connection member having a bifurcated end portion bent to engage and travel in the runways and means for securing the connection member to the motometer.

In testimony whereof I affix my signature.

RAYMOND E. PATTEN.